Figure 1:
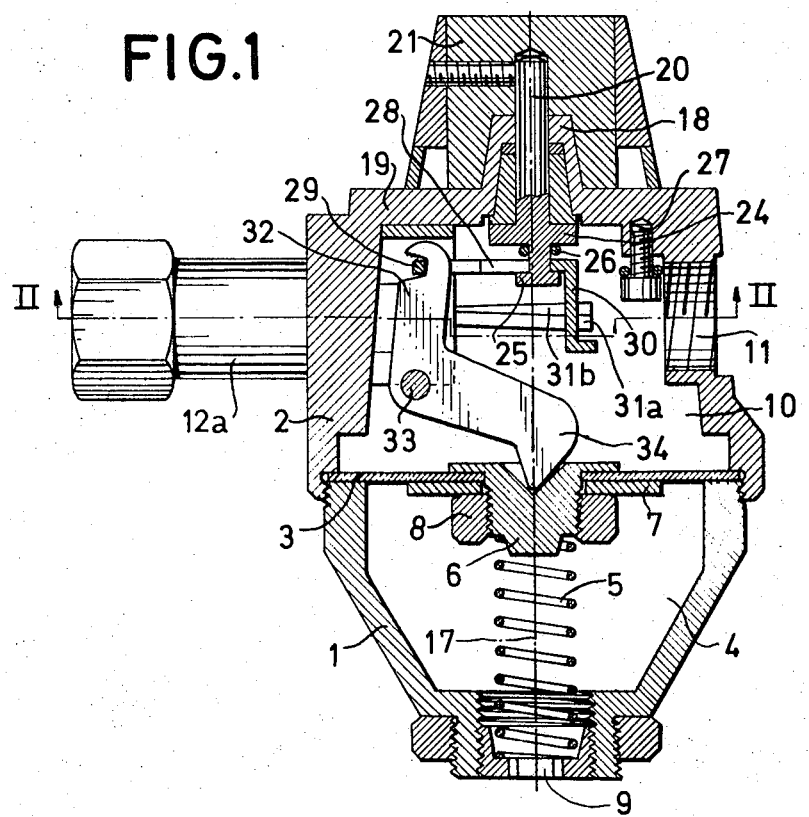

United States Patent

[11] 3,578,015

| [72] | Inventor | Frede Reinholdt Andersen<br>Niverod, Denmark |
|---|---|---|
| [21] | Appl. No. | 833,868 |
| [22] | Filed | June 3, 1969 |
| [45] | Patented | May 11, 1971 |
| [73] | Assignee | Teknova A/S<br>Nivaa, Denmark |
| [32] | Priority | July 1, 1965 |
| [33] | | Denmark |
| [31] | | 3371/65 |
| | | Continuation of application Ser. No.<br>560,502, June 27, 1966, now abandoned. |

[54] AUTOMATIC CHANGE-OVER REGULATOR FOR BOTTLED GAS SYSTEMS WITH TWO GAS CONTAINERS
11 Claims, 4 Drawing Figs.

[52] U.S. Cl. .................................................. 137/113
[51] Int. Cl. .............................................. G05d 11/00
[50] Field of Search ................................... 137/113

[56] References Cited
UNITED STATES PATENTS

| 2,197,144 | 4/1940 | Carnes ......................... | 137/113X |
| 2,626,628 | 1/1953 | Norway et al. ................ | 137/113 |
| 3,033,220 | 5/1962 | St. Clair ....................... | 137/113 |
| 3,207,169 | 9/1965 | Miller .......................... | 137/113 |

*Primary Examiner*—William F. O'Dea
*Assistant Examiner*—David J. Zobkiw
*Attorney*—Stevens, Davis, Miller & Mosher

ABSTRACT: An automatic changeover regulator for selecting which of two gaseous fluid sources will supply a gas-consuming apparatus. The regulator has a casing with two inlets each of which has an associated valve controlled by a discharge fluid pressure responsive means and a switchover device including manual means operable to select one source as the service source, the other source being in reserve, and which, in either position, is automatically operable by the valve controlling means to indicate whether gas is actually being admitted from the service or reserve source.

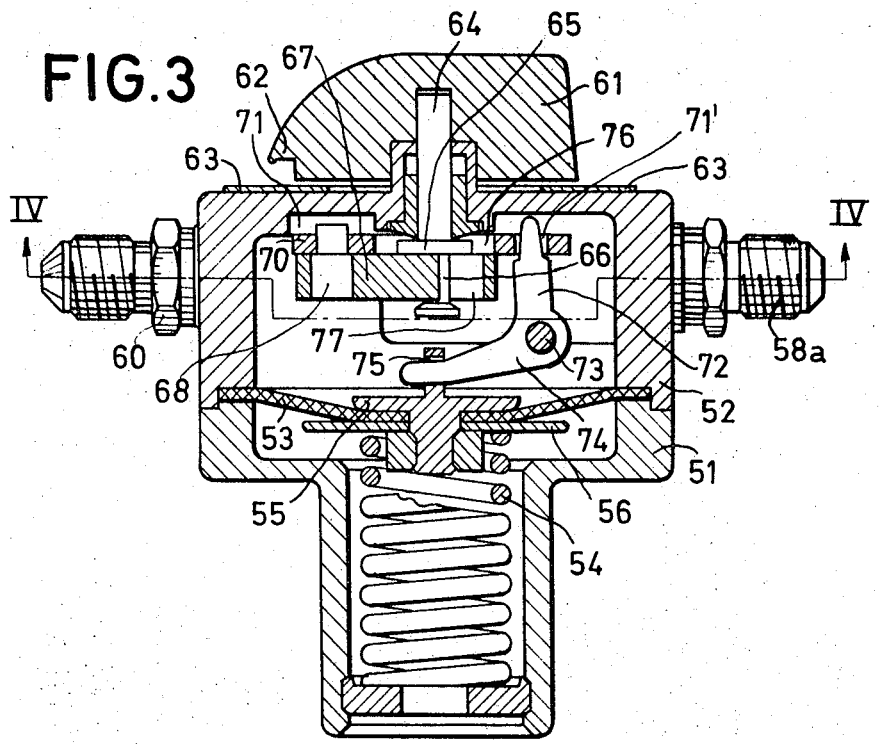
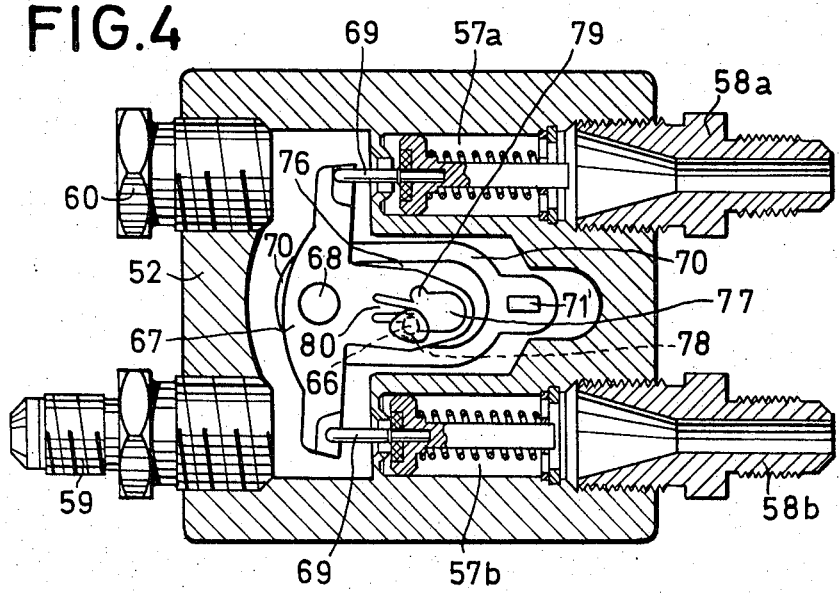

3,578,015

AUTOMATIC CHANGE-OVER REGULATOR FOR BOTTLED GAS SYSTEMS WITH TWO GAS CONTAINERS

The present application is a continuation of application Ser. No. 506,502 filed June 27, 1966 and now abandoned.

In connection with bottled gas systems with two or more gas containers it is known to connect the latter to the gas-consuming apparatus or apparatuses by means of a changeover regulator with different fundamental positions, each corresponding to one of the gas containers. When the changeover regulator is set in a certain fundamental position, gas is consequently taken from only one container, while the remaining gas container or gas containers are reserve containers. To avoid an interruption of the gas supply when the gas container functioning as supply container is on the point of being emptied or for other reasons cannot cope with the momentary consumption, automatic changeover regulators have been developed which without the fundamental position being changed enable gas to be taken also from the reserve container or one of the reserve containers. At any time after this, the changeover regulator can be changed over manually into the position corresponding to this reserve container serving as supply container, and the emptied container can be disconnected from the system and be substituted by a full container which from the start is incorporated as a reserve container. The changeover regulator may furthermore be provided with an indicator indicating whether gas is being taken from the supply container corresponding to the momentary fundamental position of the changeover regulator or whether the said container is ready for being exchanged.

This invention relates to such an automatic changeover regulator for bottled gas systems with two gas containers. More precisely defined, this automatic changeover regulator is of the known type comprising a housing with a chamber provided with at least one gas outlet and two inlets intended for being connected to a respective gas container and provided with shutting-off valves which by the gas inlet pressure are loaded in their closing direction and are arranged for being opened successively dependent on the pressure prevailing in the chamber, said pressure acting on one side of a diaphragm which forms a wall of the chamber and on its other side is loaded by a compression spring and which is connected to a valve opening member, placed in the chamber and changeable between two fundamental positions by means of an external maneuvering member, that at decreasing pressure in the chamber said valve opening member is moved in the valve-opening direction and during this movement opens first one and next—when the pressure drops below a value determined by the spring—the other inlet valve, the valve opening member being connected to an indicator for indicating the opening of the other inlet valve.

In known changeover regulators of this type, the indicator is formed by a separate element which is mounted movably, e.g. displaceably or tiltably, in the housing of the changeover regulator and follows the movements of the diaphragm. In order that the momentary position of the indicator element and thereby that of the diaphragm can be read or ascertained, the housing comprises a window through which the indicator or part of the latter is visible.

The invention aims at eliminating such separate indicator element which complicates the construction of the changeover regulator to some extent and furthermore increases the need of space inside the housing of the changeover regulator so that the said housing must be made larger than necessary.

To gain this aim, the indicator of the automatic changeover regulator according to the invention is formed by the external maneuvering member, the latter being so connected to the valve opening member that the movement of the latter in the valve-opening direction entails a turning of the maneuvering member away from the position of the latter corresponding to the fundamental position selected for the valve opening member.

Thus, as was the case in the known changeover regulators, the maneuvering member has two fundamental positions, each corresponding to one of the two gas containers, but these fundamental positions are not fixed, the maneuvering member being within the fundamental position selected capable of being turned through a certain angle when gas is being discharged from the reserve container through the changeover regulator.

The fact that the maneuvering member proper is utilized as indicator not only makes possible a certain simplification in the construction, but also entails a particularly distinct indication of the momentary situation By a single glance as the changeover regulator the consumer will easily be able to ascertain whether it is time to changeover from one to the other gas container and to exchange the first gas container.

The maneuvering member may advantageously be rotatable around an axis which is substantially perpendicular to the diaphragm, said member being in fixed connection with a pin which is eccentric in relation to this axis and engages a bearing opening in the valve opening member. A displacement of this member will then via the eccentric pin cause an angular turning of the maneuvering member, thereby indicating that gas is now being taken from the reverse container.

The two inlet valves may comprise guiding spindles, the directions of which are substantially perpendicular to the axis of rotation of the maneuvering member and intersect in a point close to the said axis and which are in connection with the valve opening member through push rods extending past the axis of rotation and in the respective fundamental positions furthermore past the eccentric pin of the maneuvering member. To this construction it will apply that both inlet valves may be closed when the maneuvering member takes up such a position that the eccentric pin intersects the angle bisector of the guiding spindles at the side of the axis of rotation of the maneuvering member which is remote from the valves. When the maneuvering member is turned away from this position, the eccentric pin will approach one of the two inlet valves, while at first its distance from the other valve will be slightly increased. The valve opening member loaded by the compression spring of the diaphragm will be carried along in this movement and will therefore through one push rod cause an opening of the associated inlet valve, while the other remains closed. A further turning of the maneuvering member in the same direction, will cause the distance from the eccentric pin to the other inlet valve to be reduced, so that this valve will open when the quantity of gas passing through the first valve is not sufficient to keep time with the consumption.

The two push rods may, with their ends facing away from the inlet valves, be journaled on a pin which is carried by the valve opening member and in the closed position of the changeover regulator lies approximately in the plane defined by the axis of rotation of the maneuvering member and the eccentric pin, and on the side of this pin remote from the axis of rotation. Hereby the opening operation outlined above is ensured in a simple way whether the maneuvering member is turned to one or the other side from the closed position, and it is likewise easy to ensure a suitable ratio of gearing between the angle of turning of the maneuvering member and the opening movements of the valves.

The pin on which the push rods are journaled is preferably placed at one end of an elongated opening into which the eccentric pin engages. The purpose of this measure is that it should be possible to have the valve opening member changed over from one of its fundamental positions to the other without the maneuvering member during this operation passing the closed position, as this would entail a short interruption of the gas supply.

Furthermore, it is preferred that the maneuvering member is spring-loaded towards its closing position located between the two fundamental positions, and in which the valve opening member permits both inlet valves to be closed. A consequence of this spring load will be that the eccentric pin of the maneuvering member is held in abutment against the end, facing away from the inlet valves, of the elongated opening of the valve opening member except when this member is changed over from one of its fundamental positions to the other. Thus, during this operation the eccentric pin may perform a lost motion longitudinally of the elongated opening without carrying along the valve opening member during this movement.

In certain cases it is regarded as less expedient to let the two inlet valves have diverging directions as indicated above. In this case, the changeover regulator may be so designed that the two inlet valves comprise spindles which are substantially parallel and disposed on respective sides of the axis of rotation of the maneuvering member and in a plane at substantially right angles to the latter, each valve spindle cooperating with one end of a rocker member serving as valve opening member and having a pivot which is parallel to the axis of rotation and intersects or lies at a slight distance from the line of connection between the two ends of said member and is guided for transverse displacement parallel to the direction of the spindles, the rocker member being furthermore guided by engaging the eccentric pin of the maneuvering member. A changeover regulator designed in this way will in principle function in the same way as that explained above, but may be of a somewhat flatter construction which may often be desirable.

The said rocker member may have two bearing openings, each corresponding to one of the fundamental positions, for the eccentric pin which is fixed releasably in the opening associated with the fundamental position selected. A changeover from one fundamental position to the other will here require an overcoming of the said fixation, so that an accidental or unintentional actuation of the maneuvering member cannot result from such a changeover.

The two bearing openings in the rocker member may conveniently be defined by two oppositely disposed and approximately semicircular recesses in the sides of an elongated aperture directed towards the pivot and the end portion of a resilient tongue which extends forwards from the end of the elongated aperture located nearest the pivot. When suitably dimensioned this resilient tongue may serve for the releasable fixing of the eccentric pin in the bearing recess selected.

The pivot may advantageously be mounted in a frame inserted between the rocker member and the chamber wall in which the maneuvering member is journaled, said frame together with the pivot being guided for rectilinear displacement parallel to the valve spindles by the movements derived from the diaphragm. In this case the movement is thus transmitted from the diaphragm to the rocker member serving as valve opening member through the displaceably accommodated frame, and from the rocker member the movement is transmitted through the eccentric pin to the maneuvering member, which by being turned through a certain angle indicates that a changeover to the reserve container has been performed.

The rectilinear guiding of the frame may be ensured by the said frame with its frame sides parallel to the valve spindles enclosing a portion, concentric with the axis of rotation, of the turning pin of the maneuvering member, while the pivot engages a guiding groove in the wall of the chamber.

Figure 2:
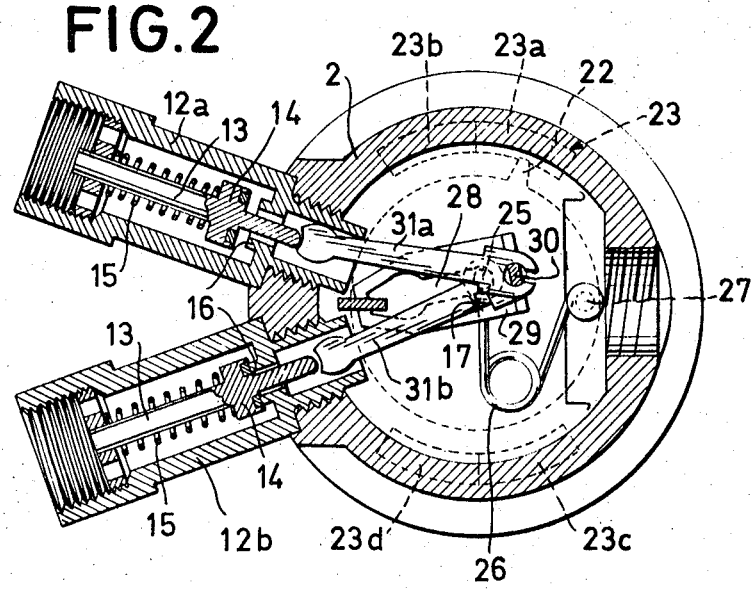

The invention will now be more fully explained with reference to the accompanying drawings in which FIG. 1 shows a vertical section through a first embodiment of the invention with two diverging inlet valves, FIG. 2 is a horizontal section taken substantially on line II–II in FIG. 1, FIG. 3 is a section corresponding to FIG. 1 through another embodiment having two parallel inlet valves, and FIG. 4 is a horizontal section taken substantially on line IV–IV in FIG. 3.

The changeover regulator shown in FIGS. 1 and 2 comprises a housing which is of circular cross section and comprises a lower part 1 and an upper part 2, between which an elastic diaphragm 3 is clamped. Under this diaphragm the housing comprises a spring chamber 4 with a helical compression spring 5 which through a diaphragm shoe 6 with a washer 7 and a tightening nut 8 loads the diaphragm 3 in the upward direction. The chamber 4 is open to the atmosphere through a hole 9 in the bottom.

Above the diaphragm 3 another chamber 10 is provided comprising a single gas outlet 11 and two inlet valves 12a and 12b which are screwed into the upper part 2 of the housing and are each supposed to be connected to a respective gas container, e.g. a gas bottle, not shown. Each of the valves 12a and 12b comprises a valve spindle 13 with a valve member 14 which by the gas inlet pressure and a helical compression spring 15 is loaded in the direction of closing against a seat 16. The two valves 12a and 12b are directed radially, so that the guiding spindles 13 point inwards towards the axis 17 of the housing.

Journaled in a central boss 18 in the upper wall 19 of the part 2 of the housing is a carrying pin 20 for a maneuvering member in the form of a turning button 21 having at its lower edge a radial projection 22, FIG. 2, which points towards an adjustment scale 23 on the upper side of the part 2 of the housing. This scale comprises different scale sections 23a, 23b, 23c, and 23d which will be further mentioned in the following.

The carrying pin 20 is mounted on the upper side of a disc 24 which on its underside carries a pin 25 which is eccentric in relation to the axis 17. A hairpin spring 26 engages this eccentric pin 25 with one leg, while its other leg is fixed by means of a screw 27 in the part 2 of the housing. The eccentric pin 25 is located in the vertical plane which comprises the axis 17 and the projection 22, and the hairpin spring 26 constantly tends to turn the eccentric pin 25 and thereby also the maneuvering member 21 towards the position in which the projection 22 points to the right in FIG. 2. This corresponds to both valves 12a and 12b being closed.

The eccentric pin 25 engages an elongated bearing opening 28 in a valve opening member which in the embodiment shown in FIGS. 1 and 2 is formed by an angle-bent plate 29, the downwards-bent branch of which forms a common journal 30 for two push rods 31a and 31b associated with the gas inlet valves 12a and 12b.

In the opposite end of the elongated opening 28 engages one arm 32 of a double-armed lever which is journaled on a transverse pin 33 in the chamber 10 and the other arm 34 of which bears against the upper side of the diaphragm shoe 6.

When the changeover regulator is in the above-mentioned closed position, in which the projection 22 of the turning button points to the right, the journal 30 will be removed as far as possible from the two valves 12a and 12b, so that the push rods 31a and 31b are kept clear of the valve spindles 13. The gas inlet pressure and the compression springs 15 will therefore keep the valve member 14 in tight contact against the associated valve seats 16.

In the position shown in the drawing, the turning button 21 is turned about 70° counterclockwise away from the closed position, so that the projection 22 points toward the scale section 23a. Hereby the push rod 31a has raised the valve spindle 13 with the valve member 14 in the gas inlet valve 12a, while the other push rod 31b is still clear of the associated valve spindle 13. Consequently, a flow of gas will occur through the valve 12a into the chamber 10, from which the gas is delivered through the outlet 11 to one or more consumption apparatuses. If now the gas pressure in the chamber 10 drops, e.g. due to lack of gas in the container to which the inlet valve 12a is connected, the compression spring 5 in the chamber 4 will press the diaphragm 3 with the diaphragm shoe 6 upwards, whereby the double-armed lever 32, 34 is turned counterclockwise, FIG. 1, and hereby exerts a left-hand pull in the valve opening member 29. This causes a turning actuation to be exerted through the eccentric pin 25 on the turning button 21, so that the projection 22 of the latter is made to point to the scale section 23b. During this operation the push rod 31b comes into contact with the valve spindle 13 of the other gas inlet valve 12b and raises this valve from the seat 16, so that gas is now taken from the bottle connected to this valve, the said bottle having till now served as reserve bottle.

The changeover from the supply bottle (the inlet valve 12a) to the reserve gas bottle (the inlet valve 12b) need not mean that the former gas bottle is empty, as the cause may well be that the evaporation of the liquid gas from this bottle has entailed such strong cooling that the delivery pressure drops below the value at which the automatic changeover occurs. If this is the case, the temperature of the supply gas bottle will after the changeover to the reserve gas bottle gradually approach the ambient temperature, so that the supply gas bottle will once more become capable of delivery. In this case, i.e. when the total quantity of gas delivered by the supply bottle through the fully open inlet valve 12a and by the reserve bottle through the more or less open inlet valve 12b exceeds the actual demand, the gas pressure in chamber 10 rises so that diaphragm 3 is forced downwardly against spring 5. Thus, lever 32, 34 turns clockwise and at least inlet valve 12b. (but possibly also inlet valve 12a dependent on the circumstances) will move towards the closed position because valve opening member 29 with journal 30 and both push rods 31a and 31b are allowed to move or shift back towards the position shown in the drawing. By such return motion button 21 is also, through eccentric pin 25, turned clockwise (FIG. 2) so that projection 21 may again point to the scale section 23a, provided that the service bottle along (inlet valve 12a) is capable to comply with the actual demand of gas. In other words the situation is now again exactly the same as before the inlet valve 12b was automatically opened. Only when the service bottle (inlet valve 12a) is no longer capable of delivering the required quantity of gas, the projection 22 will permanently point to the scale section 23b which indicates that the bottle connected to the inlet valve 12a has been emptied, or practically so, and should be exchanged.

When such exchanges shall take place the maneuvering member 21 by manually turned further on counterclockwise, until the projection 22 and thereby also the eccentric pin 25 have passed the angle bisector plane between the two inlet valves 12a and 12b. Then the maneuvering member will itself continue the turning until the projection 22 points to the scale section 23c. This indicates that the gas bottle connected to the inlet valve 12b is now serving as supply bottle. This changeover movement will have no appreciable influence on the degree of opening of the valve 12b, because of the lost-motion-connection between the eccentric pin 25 and the valve opening member 29. This member is only changed over laterally, viz. by a turning around the point of abutment against the arm 32, until the position becomes symmetrical with that shown in the drawing with regard to the said angle bisector plane between the two inlet valves.

In the new position of the changeover regulator, i.e. when the projection 22 points to the scale section 23c, the inlet valve 12a will be closed, and the empty gas bottle connected to this inlet valve may now be substituted by a full bottle to be incorporated as a reserve bottle in the system.

When hereupon the amount of gas flowing in through the valve 12b is no longer sufficient for meeting the momentary demand, the reserve bottle connected to the inlet valve 12a will be opened, and this is by the changeover regulator indicated by the projection 22 being turned to the scale section 23d. The situation will now be the same as when the projection pointed to the scale section 23b, and according to the circumstances an automatic return can be effected to gas delivery through the inlet valve 12b, or the changeover regulator may be changed manually into the position shown in the drawing.

In the embodiment of the automatic changeover regulator according to the invention shown in FIGS. 3 and 4 the housing is of rectangular cross section and comprises a lower part 51 and an upper part 52 with an intermediate diaphragm 53 which is pressure-loaded upwardly by means of a helical spring 54 threading on a disc 56 clamped together with the shoe 55 of the diaphragm. In this embodiment the changeover regulator also comprises two inlet valves 57a and 57b, but these valves are positioned in the upper part 52 of the housing, and only their connection branches 58a and 58b project out of the latter. The same applies to an outlet branch 59 and a further branch 60 which may also be connected to a consumption apparatus or may be connected to a pressure gauge.

On the upper side of the part 52 of the housing a maneuvering member is mounted in the form of a turning button 61, the beak or pointer 62 of which points to a scale 63. The button 61 is secured on a pin 64 which is rotatable in the housing and is coaxial with a disc 65 integral with a downwardly extending eccentric pin 66. This eccentric pin 66 engages a valve opening member in the form of a rocker member 67, the pivot 68 of which is parallel to the pin 64 of the turning button 61 and is located substantially on the connection line between the free ends 69 of the spindles of the inlet valves, the said spindles being in this case parallel to each other. The pivot 68 is secured in a frame 70 located above the rocker member 67 and furthermore engages a guiding groove 71 in the upper wall of the part 52 of the housing. This groove is parallel to the direction of the valve spindles.

At its other end the said frame 70 is provided with an opening 71' into which engages one arm 72 of a double-armed lever which is rotatable on a transverse pin 73 and the other arm 74 of which engages an aperture 75 in the diaphragm shoe 55.

Between the opening 71' and pivot 68 the frame 70 is provided with an elongated aperture 76 of a width corresponding to the diameter of the disc 65 on the lower end of the pin 64. The rocker member 67 is provided with a cut 77, the contour of which appears from FIG. 4. As will appear from this illustration, the cut 77 comprises two oppositely located and approximately semicircular recesses 78 and 79, each of which can separately accommodate the eccentric pin 66 which is releasably secured in the selected bearing recess by means of the end portion of a resilient tongue 80 extending forwardly from the end of the elongated cut 77 which is nearest the pivot 68.

The branches 58a and 58b are each supposed to be connected with a respective gas bottle, the first one of which serves as supply bottle and the second as reserve bottle. As long as the supply bottle supplies a sufficient amount of gas through the inlet valve 57a, the changeover regulator will remain in the position shown in the drawing, but when this amount of gas is no longer sufficient, the compression spring 54 will press the diaphragm 55 upwards so that the double-armed lever 72, 74 is turned clockwise around the pin 73 and thereby causes the frame 70 to be displaced in the direction to the right. This movement of displacement will, through the pivot 68, be transmitted to the rocker member 67, thereby opening the inlet valve 57b from the reserve bottle and, through the eccentric pin 66, causing a turning of the pin 64 and the turning button 61, so that the pointer 62 of the latter will now point to a scale section 63 indicating that gas is being taken from the reserve bottle.

When the supply bottle has been emptied, the changeover regulator is changed manually by a turning of the maneuvering member 61, so that the eccentric pin 66 is forced out of the bearing recess 78 and is instead brought to engage the bearing recess 79. Accordingly, the gas bottle connected to the inlet branch 58b will now serve as supply bottle, and the other, emptied gas bottle can be substituted by a full gas bottle serving as a reserve bottle of the system. Thus, the mode of operation of the changeover regulator is in this embodiment quite analogous with that of the changeover regulator according to FIGS. 1 and 2.

In both embodiments described it may, e.g. by means of suitable stops on the turning button 21 or 61, be ensured that when being changed over from one fundamental position to the other the button cannot pass the closed position mentioned above in which both inlet valves are blocked.

I claim:

1. An automatic changeover regulator for bottled gas systems with two gas containers, comprising a housing having a chamber provided with at least one gas outlet and two inlets, the former being connected to a gas consuming means and the latter being connected to respective gas supply containers, a shutting-off valve in each said inlet which by the gas pressure therein is loaded in the closing direction, a diaphragm forming a wall in the chamber and responsive to pressure therein, a compression spring biasing said diaphragm toward said chamber, a double armed lever one arm of which is operatively connected to said diaphragm, a valve opening means mounted in the chamber operatively connected to the other arm of said lever, an external maneuvering member operatively connected to said valve opening means for manually selecting between two fundamental positions which correspond to gas feed from said containers respectively, whereby when said valve opening means is set in one of said fundamental positions opening one of the shutting-off valves to allow gas feed from one of said containers, decreasing pressure in the chamber causes said diaphragm to move inwardly and transmit a moving force through said double armed lever to said valve opening means causing opening of the other shutting-off valve to allow gas feed from the other of said containers, indicator means on said external maneuvering member for indicating which container is feeding gas to the chamber.

2. A changeover regulator as claimed in claim 1, wherein the maneuvering member is rotatable around an axis which is substantially perpendicular to the diaphragm, a pin fixed to said maneuvering member eccentric in relation to said axis, a bearing opening in the valve opening means, said pin engaging in said opening.

3. A changeover regulator as claimed in claim 2, wherein the two shutting-off valves are provided with guided spindles, the directions of which are substantially perpendicular to the axis of rotation of the maneuvering member and intersect close to the latter, said valve opening means includes push rods connected to said spindles, said rods extending past the axis of rotation and in the respective fundamental positions furthermore past the eccentric pin.

4. A changeover regulator as claimed in claim 3, further comprising a common pin on said valve opening means and having journaled thereon the ends of the push rods facing away from the spindles and in the closed position of the changeover regulator said common pin lying approximately in the plane defined by the axis of rotation of the maneuvering member and the eccentric pin, and on the side of the eccentric pin remote from the axis of rotation.

5. A changeover regulator as claimed in claim 4, wherein said bearing opening comprises an elongated opening in said valve opening means, the common pin of the valve opening means on which the push rods are journaled being at one end of said elongated opening into which the eccentric pin engages.

6. A changeover regulator as claimed in claim 2, further comprising means to spring bias the maneuvering member towards a closed position located between the two fundamental positions and in which both shutting-off valves are closed.

7. A changeover regulator as claimed in claim 2, wherein the two shutting-off valves are provided with spindles which are substantially parallel and located on opposite sides of the axis of rotation of the maneuvering member and in a plane at approximately right angles to the latter, said valve opening means including a rocker member having a pivot which is parallel to the axis of rotation substantially at the connection line between the two ends of said rocker member, each end of said rocker member cooperating with one of said valve spindles, said rocker member being guided for transverse displacement parallel to the direction of the spindles, the rocker member being furthermore guided by engaging the eccentric pin of the maneuvering member.

8. A changeover regulator as claimed in claim 7, further comprising a second bearing opening in said rocker member each opening corresponding to one of said fundamental positions, said eccentric pin being releasably secured in the opening associated with the normally selected fundamental position.

9. A changeover regulator as claimed in claim 8, wherein the two bearing openings of the rocker member are defined by two oppositely located an approximately semicircular recesses in the sides of an elongated aperture directed towards the pivot, and the end portion of a resilient tongue which extends forward from the end of the elongated aperture closest to the pivot.

10. A changeover regulator as claimed in claim 7, further comprising a frame inserted between the rocker member and the chamber wall in which the maneuvering member is journaled, said frame having said pivot mounted thereon and being guided for rectilinear displacement parallel to the valve spindles by the movements derived from the diaphragm.

11. A changeover regulator as claimed in claim 10, wherein side portions of said frame parallel to the valve spindles enclose a concentric portion of the turning pin of the maneuvering member, a guiding groove in the chamber wall having said pivot engaging therewith.